Patented June 28, 1938

2,121,900

UNITED STATES PATENT OFFICE 2,121,900

INSULIN PREPARATION

Fritz E. Bischoff, Santa Barbara, Calif.

No Drawing. Application March 2, 1936,
Serial No. 66,607

3 Claims. (Cl. 167—75)

This invention relates to an insulin preparation.

The general object of the present invention is to provide an insulin extract which will permit the injection of larger amounts of insulin than with the extracts now in use; to provide a preparation which will enable the reduction in the number of injections necessary in treatment with insulin; and to provide a preparation which will give a prolonged physiological action to a single injection.

I have discovered that by adding a histone, such as the thymus histone, to insulin that the activity of the insulin when measured in the ordinary way upon rabbits may be considered to be clearly lessened; but that if doses of such a preparation of insulin and thymus histone are applied corresponding to a number of times the normal dosage, there can be produced a long drawn-out hypoglycemia, exceeding, for example, fourteen hours. Moreover, this extract in the regular treatment of diabetic patients may be administered with less frequency using a total of less insulin per period of treatment to secure the same control of the urinary sugar output and the morning blood sugar than would be secured with the present practice of using commercial insulin.

When the histone is added to ordinary commercial insulin there is formed an insoluble compound which is still insoluble at a pH alkaline to phenolphthalein, and is so slowly absorbed when administered subcutaneously that tremendous dosages of insulin may be administered at one time without producing convulsions, whereby hypoglycemia is produced which will extend over long periods of time, such as fourteen hours. In this way the frequency of the treatments necessary to control diabetic patients may be greatly diminished.

The present invention, together with various objects and advantages thereof, will best be understood from an example, or examples, of operations embodying the invention. For this purpose, I shall hereafter describe the preferred forms or examples of the invention.

In one example of the invention, an aqueous solution of thymus histone (7 mgm. per cc.) was sterilized by heating to 60° C. on successive days. The thymus histone was prepared by the method of Kossel and Kutscher (Zeitschr. f. physiol. chem. 31, 188). 1 cc. of this solution was then added sterilely to a 10 cc. vial of commercial insulin. This solution was then mixed with an equal volume of sterile 0.25 to 0.50% NaHCO₃ solution (conveniently done in a Luer syringe) to form a suspension.

As a second example of the invention, a colloidal suspension of the thymus histone insulin may be prepared in gelatin by mixing at a pH acid to the isolective point of insulin, solutions of gelatin, insulin and thymus histone, and adjusting the pH to 7.4. The final colloidal suspension in one example was 2% gelatin, 18 units insulin per cc., and 0.05% histone.

In a third example, a preparation was made by adding insulin and histone in an acid solution and adding acid alkali until the pH was just pink to phenolphthalein. The precipitate was separated by centrifugation, washed with water, and finally taken up to any volume desired (as a suspension).

As an illustration of the action of the preparation, the following examples will be given, the preparations in these examples having been produced in accordance with the first method. The first example shows the comparative action of the preparation when used in equal doses with that of ordinary commercial insulin. In two tests supplied to rabbits the average blood sugar on five rabbits (control experiment before and also after histone experiment) was as follows:

| | 1 hr. | 3 hr. | 5 hr. |
|---|---|---|---|
| 1 u. commercial insulin per kilo | 50 | 58 | 103 |
| 1 u. insulin+.4 mg. histone per kilo | 78 | 98 | 110 |

This shows that the insulin combined with the histone was mostly destroyed or most of it liberated so slowly that the effect upon the blood sugar was not detectable.

The dosage of commercial insulin which produced convulsions on five rabbits was ascertained. This dose proved to be one unit for one rabbit, two units for three rabbits, and four units for a fifth rabbit. These rabbits were then given 12 and 16 units of the histone insulin subcutaneously, and below are tabulated the comparative results secured: of less insulin is required than with the usual methods.

Blood sugar values

|  | Units per kilo | 0 | 1 hr. | 3 hr. | 5 hr. | 8 hr. | 12 hr. | 14 hr. | 24 hr. |
|---|---|---|---|---|---|---|---|---|---|
| Commercial insulin | 1-4 | 120 | 50 | *Convulsion | | | | | |
| Histone insulin | 12 | 110 | 54 | 40 | 62 | 48 | | | |
| Histone insulin | 12 | 140 | 58 | 48 | 58 | 70 | 62 | 80 | 122 |
| Histone insulin | 12 | 144 | | | 72 | 80 | 76 | 90 | 150 |
| Histone insulin | 16 | 128 | | | 54 | 72 | 30 | *Convulsions | 116 | 130 |

This experiment shows that histone insulin is so slow-acting that six times the dose which would produce severe convulsions with commercial insulin may be given, the effect being the production of a long drawn out hypoglycemia exceeding 14 hours. Even with the extremely high dose of 16 units per kilo, convulsions did not occur until after 8 hours. The production of hypoglycemia without convulsions over a 14 hour period by one dose of insulin would obviously be a great advance in the treatment of diabetics. Similar results were obtained with the histone from chicken blood cells.

The histone insulin of the present invention when administered under hospitalized control and on isocaloric diets may be used to control the urinary sugar. For this purpose, the histone insulin of the present invention may be given in less frequent doses, and in certain cases a total of less insulin is required than with the usual methods.

While the particular preparations herein described are well adapted to carry out the objects of the present invention, it is understood that the invention is not limited to the specific examples cited, and includes such variations and changes as come within the scope of the appended claims.

I claim:

1. A medical preparation, including a suspension of insoluble insulin histone composition suitable for subcutaneous injections in animals and man.

2. A medical preparation, including a colloidal suspension of insoluble insulin histone composition suitable for subcutaneous injection.

3. A medical preparation including a suspension of insoluble insulin histone composition suitable for subcutaneous injection having a pH of about 7.4.

FRITZ E. BISCHOFF.